June 29, 1926.

C. H. LOGUE 1,590,466

MACHINE AND METHOD FOR PRODUCING GEARS

Filed May 26, 1925    4 Sheets-Sheet 1

Inventor
Charles H. Logue

By B. E. Shlesinger
his Attorney

June 29, 1926.

C. H. LOGUE 1,590,466

MACHINE AND METHOD FOR PRODUCING GEARS

Filed May 26, 1925    4 Sheets-Sheet 2

Inventor
Charles H. Logue
By B. E. Schlesinger
his Attorney

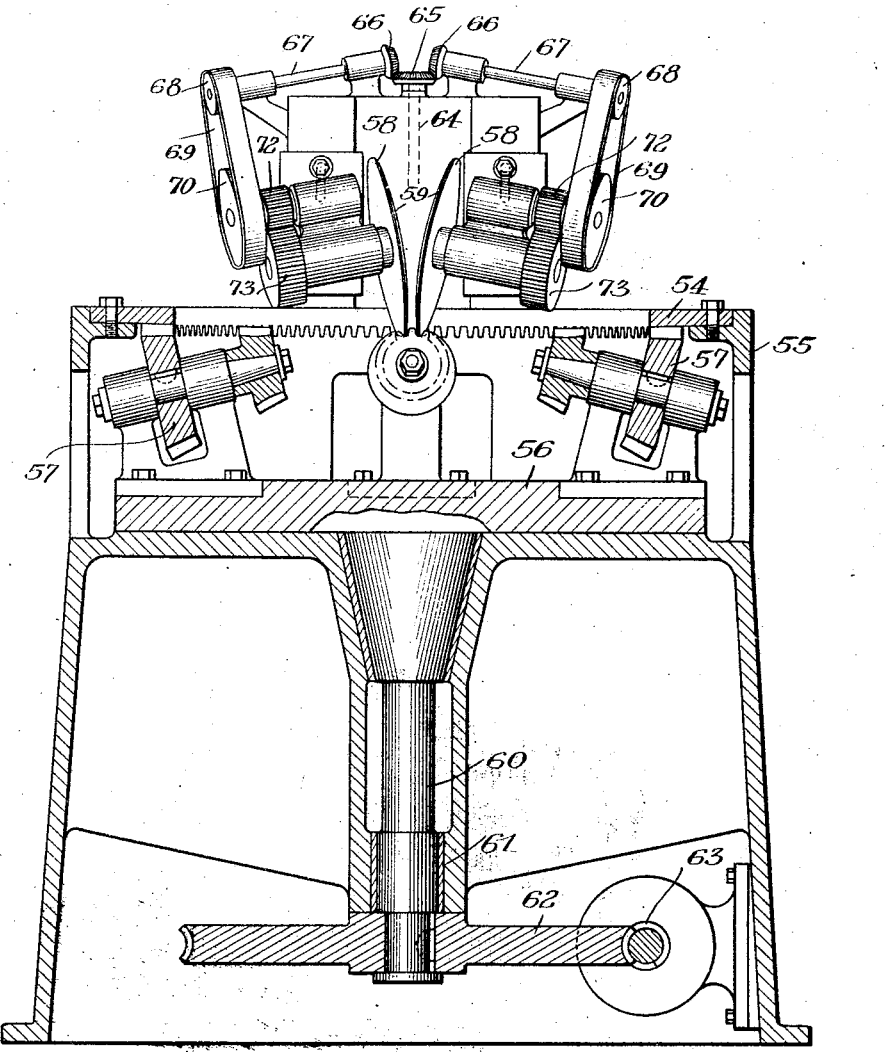

June 29, 1926.
C. H. LOGUE
1,590,466
MACHINE AND METHOD FOR PRODUCING GEARS
Filed May 26, 1925  4 Sheets-Sheet 4
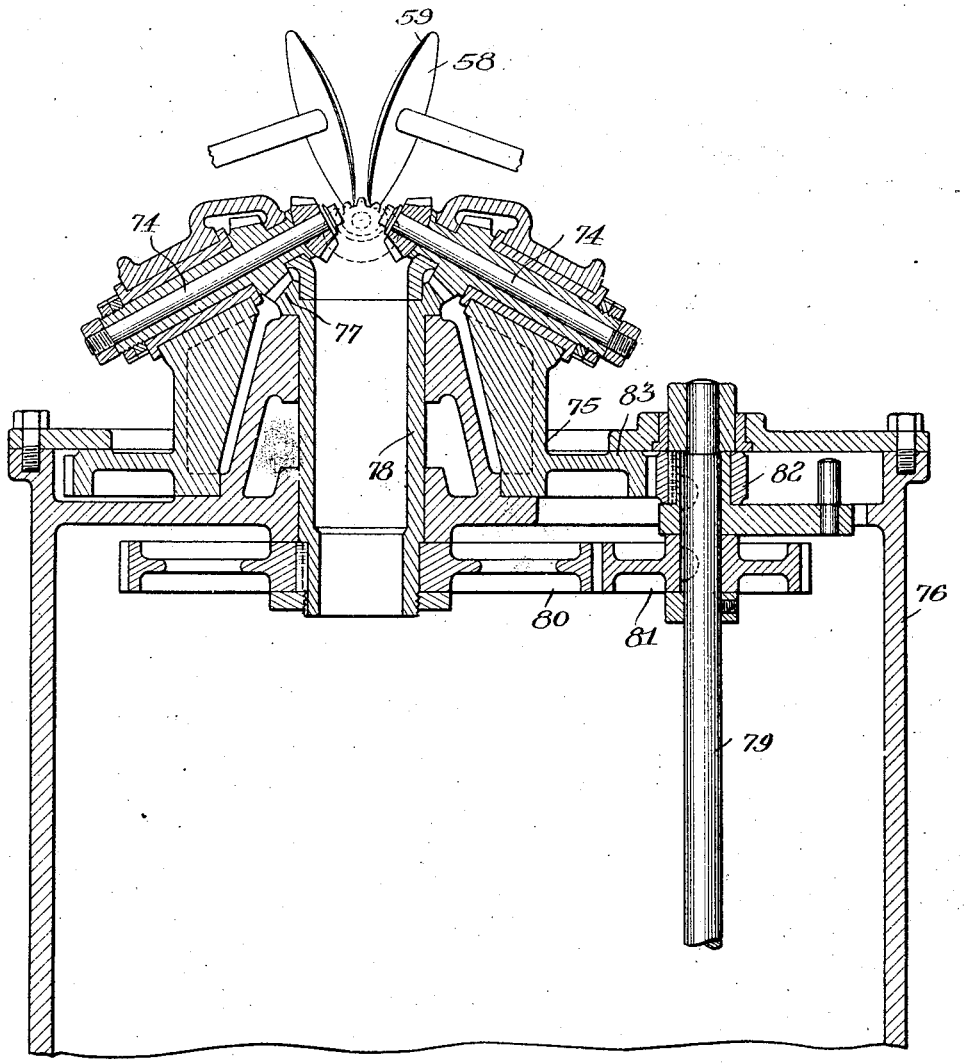

Patented June 29, 1926.

1,590,466

UNITED STATES PATENT OFFICE.

CHARLES H. LOGUE, OF SYRACUSE, NEW YORK, ASSIGNOR TO GLEASON WORKS, OF ROCHESTER, NEW YORK, A CORPORATION OF NEW YORK.

MACHINE AND METHOD FOR PRODUCING GEARS.

Application filed May 26, 1925. Serial No. 32,917.

The present invention relates to a machine and method for producing gears.

One of the objects of the invention is to provide a machine and a method for producing gears by which a plurality of gear blanks may be finished simultaneously.

A further object is the provision of a machine and method in which the blanks being operated upon are continuously indexed.

A still further object is the provision of a machine and method in which the gear blank or blanks is or are rolled continuously in one direction for the purpose of generating the teeth and to index.

A still further object is the provision in a gear cutting machine of mechanism for speeding up the operations during the time the tool and blank or blanks are out of engagement.

Other objects will appear hereinafter from the specification and from the claims.

With the above and other objects in view, the invention resides in the novel features included in the machine of this invention, and in the novel steps constituting the new process, all of which are illustrated in the accompanying drawings, described hereinafter in the specification or recited in the claims appended hereto.

In the drawings:

Fig. 4 is a vertical section showing a still further embodiment of my invention; and Fig. 5 is a fragmentary vertical section of a still further embodiment of the invention.

According to the present invention a plurality of gear blanks are carried successively into engagement with a relatively fixed tool so as to produce upon each of the blanks, successively, a tooth or tooth space and are moved in a closed path to index and to again bring the blanks into engagement with the tool. During the time of engagement with the tool, the blanks are rolled relatively to the tool so as to generate the tooth profiles. This rolling motion is so imparted to each of the blanks at the time of their engagement with the tool as to give them a motion as of a gear rolling on a crown gear.

In the usual type of bevel gear generating machine, the blanks are rolled, while in engagement with the tool, upon an imaginary crown gear represented by the tool. This imaginary crown gear upon which the blank is rolled has, except in rare instances, a fractional number of teeth. Because of the fractional tooth number, it has, heretofore, been necessary in bevel gear cutting to either index the blank after every tooth space, returning the tool and blanks after the completion of each tooth or tooth space to their original position, that is, the position at the beginning of the generating movement, or to use a special cutting tool and to so time the tool and blank movements that the tool will come into engagement with a different tooth space each time it operates on the blank. The first of these methods involves a loss of time for indexing and the second involves very great practical difficulties in the construction or setting of the tools and in the proper timing of the blank and tool movements.

I have discovered that if, instead of rolling the blanks on the basic crown gear, they are rolled continuously in one direction on an imaginary gear having an integral number of teeth, and preferably the number nearest that of the crown gear, and if the obliquity of the tool is so adjusted or corrected as to compensate for the difference in tooth number, between this imaginary gear and the basic crown gear, suitable tooth profiles can still be produced, constructional difficulties are overcome and the blanks may be continuously indexed.

This invention, hence, relates to a method and machine in which the blank or blanks are rolled during the cutting operation, continuously in the same direction, as though rolling on a gear having an integral number of teeth. According to the preferred embodiment of this invention, the tool will be fixed relative to the path of movement of the blanks i. e. the blanks will roll as in mesh with an imaginary stationary generating gear having an integral number of teeth.

This invention may be employed in the cutting of bevel gears having straight, skew, or curved teeth and may be practised in various ways.

Figure 1:
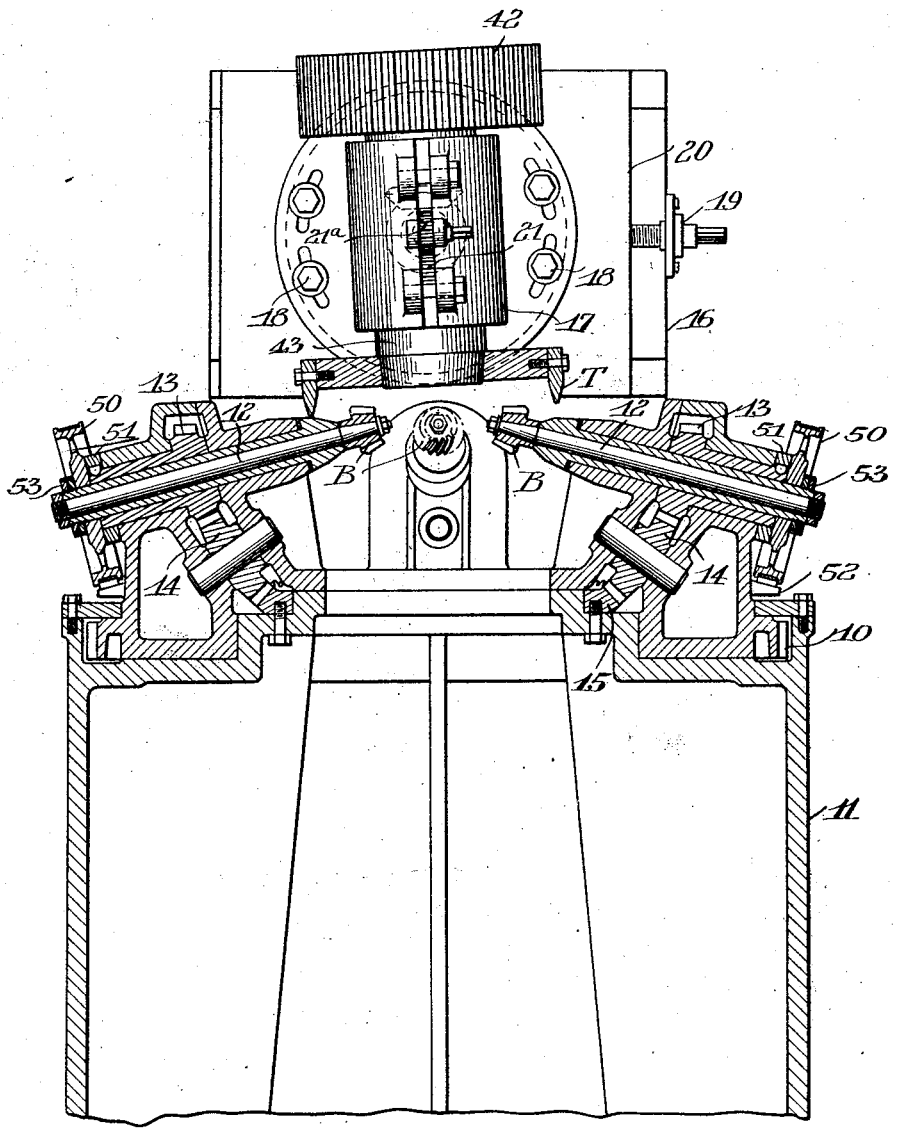
Fig. 1 is a vertical sectional view illustrating a machine constructed according to one embodiment of my invention.

In Fig. 1 I have shown a machine constructed for the generation of bevel gears having longitudinally curved teeth. 10 designates a blank carrier rotatably mounted upon the frame 11 of the machine and adapted to carry the blanks B which are to be operated upon. The blanks are so positioned that their axes intersect in a single point, which is the center of the gear upon which they are theoretically rolled. This point lies on the axis of rotation of the blank carrier. The blanks are secured upon spindles 12 in any suitable manner.

In the embodiment of the invention shown in Figure 1 each of the blank spindles 12 is connected with a gear 13, journaled in the blank carrier 10. Each gear 13 meshes with an idler 14 also journaled in the blank carrier 10 and each idler meshes with a ring gear 15, which is fixedly secured to the frame 11.

Rotation may be imparted to the blank carrier 10 in any suitable manner as will hereinafter be described. Rotation of the blank carrier will cause, through the gearing 13, 14, and 15 rotation of the blanks about their respective axes. One member of this train of gearing 13, 14, 15 is, preferably made prime to another member thereof to permit continuously indexing the blanks.

The tool T, which in this embodiment of my invention is a rotary face mill is so mounted that the obliquity or inclination of a side cutting edge of the tool may be adjusted relative to the side face of the tooth to be cut thereby to compensate for the difference in tooth number between the basic crown gear and the imaginary integral tooth gear, which the tool represents and on which the blanks roll. This correction may be made in any suitable manner as will be described, hereinafter. The tool is rotatably mounted in a head 16 which is horizontally adjustable upon the frame 11 and can be tilted to the desired angle to cut the gears to their full depth by adjusting the carrier 17, and securing the carrier in the desired position by tightening the bolts 18. The tool can be moved horizontally to cut the two sides of the teeth, as will hereinafter be explained, by means of the screw 19 which engages a nut (not shown) on the slide 20. Any suitable means, as the rack 21 and pinion 21$^a$ may be provided to lift the tool out of cutting position so as to remove finished blanks and chuck new ones.

Both tool and blanks are driven from the shaft 22, which is rotated through gearing 23, 24, from the shaft 25 which is journaled in the frame 11 and which is rotated by a pulley 26, driven from any suitable source of power. The gearing 24 includes bevel pinions 24$^a$ and 24$^b$, forming part of a reversing mechanism shiftable, in the usual manner by the lever 27. The shaft 22 carries a miter gear 28 meshing with the miter 29 on the shaft 30 and a miter 31 meshing with the miter 32 on the shaft 33. The shaft 30 drives through the miter gearing 34, 35, the shaft 36 which through the miter gearing 37, 38, drives the shaft 39 upon one end of which is mounted a spur pinion 40 which engages an idler 41 and through the idler drives the spur gear 42 mounted upon one end of the tool spindle 43. The gear 42 is provided with a relatively long face so as to permit rotation of the tool in various positions of its vertical adjustment.

The blank carrier 10 is driven from the shaft 33 by the pinion 44 which is splined to the shaft and which engages the gear 45 secured to the blank carrier.

This machine is particularly adapted for the generation of pinions and the number of pinions which can be generated simultaneously will depend upon their cone angles. Where the arrangement of the blanks spindles on the carrier 10 is such that there will be an interval between the engagement of successive blanks with the tool, it is desirable to provide some means for speeding up the operation of the machine during such intervals. The preferred means involves an intermittent type of gearing in which the pinion 44 is provided with teeth on a portion of its periphery only and in which the gear 45 is also provided with teeth on a portion of its periphery only. The pinion 44 has secured to it or made integral with it a lever arm 46 to which is secured a pin 47 adapted to engage a slot or slots 48 in the periphery of the gear 45 and located intermediate the toothed portions of such gear. During the time of engagement of a blank with the tool the carrier 10 will be rotated slowly by the intermeshing engagement of the toothed portions of the gear and pinion. As soon as the blank has passed out of engagement with the tool the pin 47 on the lever arm 46 comes into engagement with the slot 48 and acts to throw the gear 45 and the blank carrier 10 around to the position where the next blank can be operated upon by the tool.

The shaft 30 can swivel about the shaft 22 so as to permit the desired horizontal adjustment of the tool and this shaft is splined so as to maintain the drive between the gears 34 and 35 in any position of the tool adjustment. The whole tool head 16, as heretofore described, is adjustable on the frame 11 so as to permit cutting of the blanks with any desired tooth spiral angle. To permit this adjustment the frame 11 is provided with a guide way 49.

Ordinarily in the cutting of curved tooth bevel gears, it is desirable to cut one side of a tooth at a time, the blank and tool being reset for the cutting of the second side after one side of each tooth has been finished. In the present machine mechanism has been provided for effecting the resetting of the blanks automatically. This mechanism involves a slip clutch connection between the gear 13 and the blank spindle 12. The slip clutch may be of any suitable structure. As shown, a friction drum 50 is secured to each of the blank spindles 12 and frictionally engages a disc 51 keyed to the sleeve of the gear 13. The drums 50, during rotation of the blank spindles 12 rotate upon a friction ring 52 secured to the blank carrier 10. The drum 50 can be adjusted by means of the nuts 53 to obtain sufficient friction between the drum and the disc 51 to insure rotation of each of the spindles 12 upon rotation of the blank carrier. When the direction of rotation of the carrier is reversed, however, for the cutting of the opposite side of a tooth, as by throwing the lever 27, the friction clutch will slip slightly and the amount of slipping can be so predetermined by the adjustment of the nuts 53, that the blanks will automatically be so positioned relatively to the tool that on reengagement of tool and blanks the second side of each of the teeth of each of the blanks will be operated upon, when the blanks are next rolled into engagement with the tool. In this way manual resetting of the blanks to cut both sides of the teeth is avoided. The horizontal position of the tool may be changed automatically at the same time.

Fig. 4 shows an embodiment of my invention in which straight tooth bevel gears may be generated. In this embodiment instead of a ring gear, I use a gear 54 which is a crown gear or will approximate a crown gear and which is fixedly secured to the frame 55. By employing a gear 54 as shown, I can do away with the idlers interposed in the blank drive of the machine shown in Fig. 1. The blanks are mounted upon a carrier 56 which is rotatable in the frame 55. Rotation of the blanks about their respective axes is affected by gears 57, one of which is secured to each blank spindle and which meshes with and rolls on the crown gear 54. Gears 54 and 57 have relatively prime numbers of teeth to permit continuous indexing.

In this embodiment the tools employed are grinding wheels 58, which are of general saucer shape and are provided around their periphery with a flat surface or ribbon 59 by means of which the proper tooth profiles are generated. These wheels are in common use and no further description of their structure is thought necessary. The ribbon surface 59 represents a side of a tooth of a gear and the tools grind opposite sides of the teeth.

The blank carrier and the tools might be driven by mechanism similar to that shown in Fig. 1. For the purpose of demonstrating the adaptability of my invention to various drives, however, I have illustrated in Fig. 4 blank carrier and tool actuating mechanism somewhat different in character from that shown in Fig. 1. The blank carrier 56 has formed integral with it a hollow spindle 60 which is journaled in a bearing 61 in the frame 55 and upon the lower end of which is secured a worm gear 62 which meshes with and is driven by the worm 63. This worm is supported from the frame 55 and may be rotated from any suitable source of power. The tools 58 are driven simultaneously from the shaft 64 by bevel gearing 65, 66.

The pinions 66 are secured to shafts 67 which carry pulleys 68 which through belts 69 rotate pulleys 70, one of which is secured to each shaft 71 upon which is mounted a pinion 72 engaging with and driving the gear 73 secured to each of the grinder spindles. Any suitable mechanism, not shown, may be employed for speeding up the rotation of the blank carrier during the interval when the blanks are out of engagement with the tool if desired.

Figure 2:
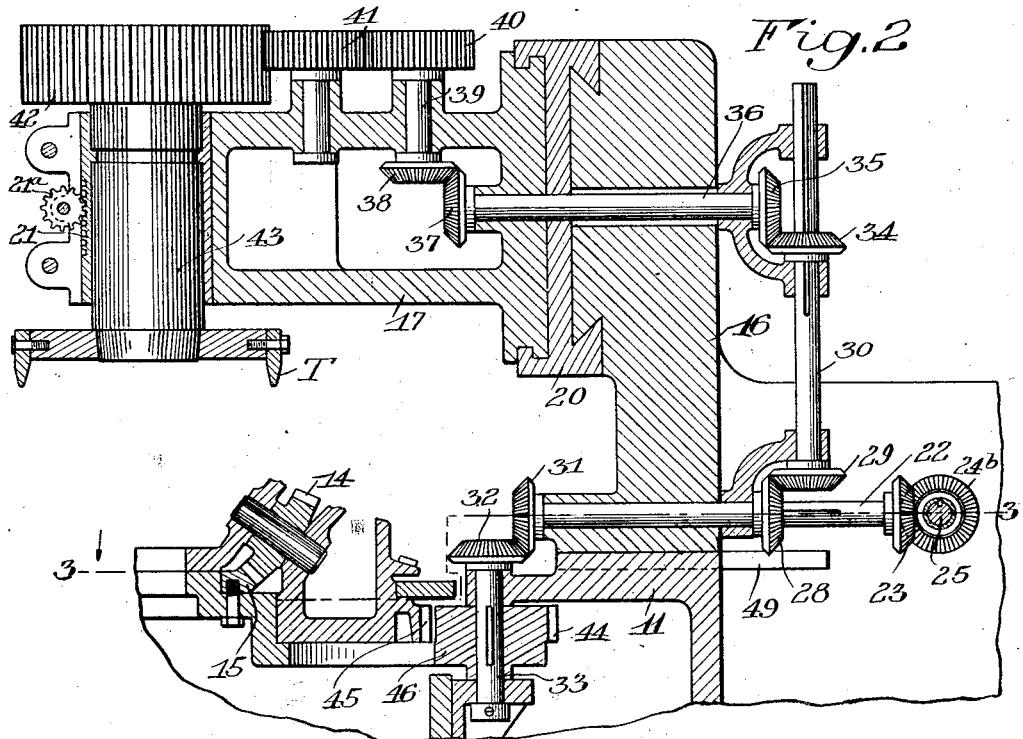
Fig. 2 is a fragmentary vertical sectional view, taken at right angles to Figure 1.
Figure 3:
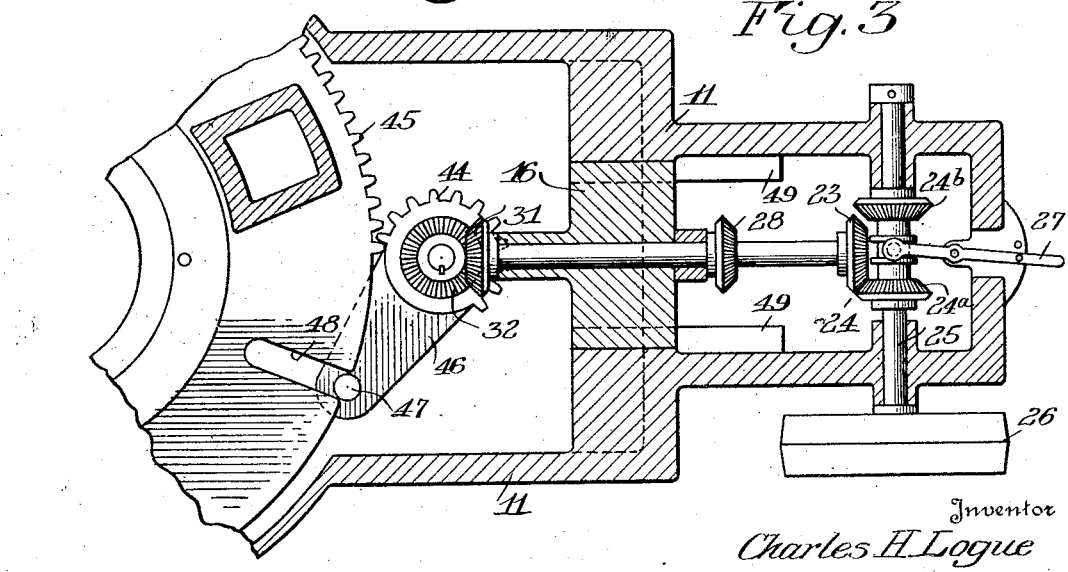
Fig. 3 is a section on the line 3—3 of Fig. 2, with parts broken away.

In Fig. 5, I have shown diagrammatically a further embodiment of the invention, also adapted for the grinding of straight tooth bevel gears. The tools employed may be the same in structure as those shown in Fig. 4. In this embodiment the blank spindles 74 are rotatably mounted on a blank carrier 75, which, as in the previously described embodiments of my invention is rotatable on the frame 76. The ring gear 77 instead of being stationary, however, is also rotatable. It has a number of teeth relatively prime to the tooth number of the gear attached to the blank spindle. This ring gear is mounted upon a spindle 78 journaled in the frame 76 and is driven from the shaft 79 by the gear 80 keyed to the spindle 78 and the pinion 81 keyed to the shaft 79. The blank carrier 75 may be rotated from the shaft 79 by an intermittent mechanism similar to that described with reference to Figs. 2 and 3. This intermittent mechanism involves the pinion 82 secured to the shaft 79 and the gear 83 fixed to the blank carrier 75. By rotating the ring gear 77 at twice the speed of rotation of the blank carrier 75, the proper generating roll can be effected.

As previously stated, this invention involves rolling the blanks upon a gear having an integral number of teeth and correcting the tool setting or pressure angle to compensate for the difference between this gear and the crown gear from which the correct tooth profiles must be derived. With the face mill shown in Fig. 1, this correction can best be accomplished by a proper selection of the tool pressure angle. With the tools shown in Figs. 4 and 5 the correction can best be accomplished by setting the tools so as to obtain the desired obliquity or pressure angle.

The machines illustrated in the various figures of the drawings are single purpose machines, that is, machines designed to generate gears having a uniform and fixed cone angle. By providing the necessary adjustments for the tool and blanks, however, these machines can be made universal.

While I have shown three embodiments of the invention in which different drives are employed it is obvious that with suitable modifications any one of these drives might be employed in connection with any of the embodiments shown.

Skew bevel gears may be cut with the machines illustrated in Figs. 4 and 5 by setting the grinding wheels so as to be tangent to a circle described about the center of the theoretical crown gear upon which the blanks are rolled. This may be effected by moving the tool heads any desired distance to the right or left of the intersection point of the blank axes.

For straight and skew bevel gears all of the blanks will be finished when the blank carrier has made a number of revolutions equal to the number of teeth to be produced on each of the blanks. For curved tooth gears, when the tool is set over and only one side of a tooth is operated upon by the tool in any blank setting, the blank carrier must be turned twice as many revolutions as there are teeth to be cut upon the blanks.

While I have shown in Fig. 1 a face mill cutting tool and in Figs. 4 and 5 grinding tools, it is obvious that in any embodiment of my invention any suitable type of tool whether grinding, milling, lapping, etc., may be employed.

While I have described my invention in connection with specific structures and in connection with specific uses for such structures, it is to be understood that the invention is capable of various further modifications and uses and that the structures may be modified without departing from the intent of the invention or the scope of the following claims, and that this application is intended to cover any adaptations or embodiments, following in general, the principles of the invention and including such departures from the present disclosure as come within known or customary practice in the gear art and may be applied to the essential features hereinbefore set forth and as fall within the scope of the appended claims.

Having thus described my invention, what I claim is:

1. The method of generating curved tooth gears which consists in imparting between a gear blank and a rotary tool, having its cutting edges projecting from a plane face, a relative rolling motion continuously in one direction to generate the teeth on the blank while the tool and blank are in cutting engagement and to return the blank periodically into engagement with the tool, said relative rolling motion being so timed that the blank is automatically indexed.

2. In a gear cutting machine, a rotary blank carrier, a plurality of blank spindles mounted on the carrier, means adapted to rotate each of said blank spindles on rotation of said carrier and a rotary tool arranged in predetermined relation to the path of movement of said spindles.

3. In a machine for generating gears, a continuously rotating tool, a rotary blank carrier, a plurality of blank spindles mounted on said carrier and having axes intersecting the axis of said carrier, and means for rotating the blank spindles on rotation of said carrier and in timed relation with said carrier rotation.

4. In a machine for generating gears, a rotary blank carrier, a plurality of blank spindles mounted on the carrier, a tool arranged in predetermined relation to the path of movement of said spindles and gearing adapted to rotate each of said blank spindles on rotation of said carrier, one member of said gearing being prime to another member thereof whereby the blanks are automatically indexed.

5. The method of producing bevel gears which consists in imparting to a blank a motion as of rolling on an imaginary gear having an integral number of teeth and correcting the obliquity of the tool to compensate for the difference in tooth number between the imaginary gear and a theoretical basic crown gear.

6. The method of producing bevel gears, which consists in imparting to a gear blank a motion as of rolling on an imaginary gear having an integral number of teeth, relatively to a tool, the obliquity of which has been previously adjusted to compensate for the difference in tooth number between said imaginary gear and a theoretical basic crown gear.

7. In a gear generating machine a plurality of blank spindles radially arranged about a common axis of rotation, means for moving the blank spindles bodily about said axis of rotation, a tool arranged in predetermined relation to the path of movement of said blank spindles, and means for rotating each of said spindles while in engagement with the tool to generate teeth on the blanks.

8. In a gear generating machine, a plurality of blank spindles radially arranged about a common axis of rotation, a rotating tool, means for moving the blank spindles bodily about said axis of rotation to present the blanks successively to said tool and means for rotating the blank spindles on their own axes in timed relation with the first rotation to generate teeth on the blanks and automatically index the same.

9. In a gear generating machine, a rotary tool, a plurality of blank spindles, means for moving the spindles to impart to each of the blanks carried thereby a movement, while in engagement with the tool, as of a gear rolling without slipping on an imaginary gear having an integral number of teeth and means for moving said blank spindles in a closed path to index the blanks.

10. In a gear generating machine, a tool, a plurality of spindles, each adapted to support a gear blank means for moving the spindles in unison to impart to each of the blanks a movement as of rolling on a gear having an integral number of teeth to bring the blank succesively into engagement with the tool and to index the same.

11. In a gear generating machine, a rotary tool, having its cutting portions projecting from a plane face, a blank spindle, means for imparting a relative rolling movement between the blank spindle and tool while the tool and blank are in engagement to generate the teeth on the blank and means for moving said blank spindle continuously in one direction to periodically return the blank into engagement with the tool.

12. In a gear generating machine a rotary tool, having its cutting portions projecting from a plane face, a blank spindle, and gearing for imparting a relative rolling movement between the blank spindle and tool continuously in one direction and in a closed path, one member of said gearing being prime to another member thereof whereby the blank is automatically indexed.

13. In a gear generating machine, a rotary tool, a plurality of blank spindles, means for imparting continuous rotation to said blank spindles and means for bringing the blanks carried thereby successively into engagement with the tool.

14. In a gear generating machine, a plurality of blank spindles, each movable about two intersecting axes, a cutting tool arranged in predetermined relation to the path of movement of said blank spindles and means for moving said blank spindles about their two axes in timed relation.

15. In a gear generating machine, a plurality of blank spindles, each movable about two intersecting axes, a rotary tool arranged in predetermined relation to the path of movement of said spindles, means for moving the blank spindles continuously about their respective axes in the manner of a gear rolling with an imaginary gear having an integral number of teeth to generate the tooth profiles and to automatically index the blanks.

16. In a gear generating machine, a rotatable blank carrier a plurality of blank spindles rotatably mounted thereon, a rotary tool arranged in predetermined relation to the path of movement of said spindles, means for rotating the blank carrier and spindles in timed relation and means for periodically accelerating the rotation of said blank carrier.

17. In a machine for generating gears, a continuously rotating tool, means for rotating a gear blank in one direction so that one side of the teeth may be finish cut and means operative on reversal of said blank movement to position the blank relatively to the tool so that the opposite sides of the teeth may be finish cut.

18. In a gear generating machine, a tool, a blank carrier, rotatable in opposite directions, a blank spindle mounted on the carrier, means adapted to be rotated on rotation of said carrier and a slip clutch connecting said means and the blank spindles.

19. In a gear cutting machine, a tool, a blank carrier rotatable in opposite directions, a blank spindle mounted on the carrier, a member adapted to be rotated on rotation of said carrier, and means normally connecting said member and the blank spindle operative on reversal of said carrier to permit a predetermined relative movement between said member and spindle.

20. In a machine for generating curved tooth bevel gears, a rotary tool having its cutting portions projecting from a plane face and annularly arranged with respect to its axis of rotation, a plurality of blank spindles, means for rotating each of said blank spindles about the axis of the blank carried thereby and means for simultaneously imparting an additional relative movement between tool and each of said blank spindles about an axis intersecting the blank axis.

CHARLES H. LOGUE.